United States Patent [19]

Sakich

[11] Patent Number: 4,905,118

[45] Date of Patent: Feb. 27, 1990

[54] BASE MOUNTED ELECTRICAL ASSEMBLY

[75] Inventor: John D. Sakich, Wadsworth, Ohio

[73] Assignee: Hubbell Incorporated, Orange, Conn.

[21] Appl. No.: 368,869

[22] Filed: Jun. 20, 1989

Related U.S. Application Data

[63] Continuation of Ser. No. 214,613, Jul. 1, 1988, abandoned, which is a continuation-in-part of Ser. No. 176,317, Mar. 31, 1988.

[51] Int. Cl.[4] .......... H02H 9/04

[52] U.S. Cl. .......... 361/117; 361/127; 338/21; 338/113; 29/605; 29/612; 29/618; 174/178

[58] Field of Search .......... 361/117–120, 361/127, 128, 130; 338/21, 71, 93, 99, 113; 174/178; 29/605, 612, 618, 610 R

[56] References Cited

U.S. PATENT DOCUMENTS

| | | | |
|---|---|---|---|
| T102,103 | 8/1982 | Lenk | 361/118 |
| 2,050,334 | 8/1936 | Kellogg . | |
| 2,586,285 | 2/1952 | Ackermann . | |
| 2,587,587 | 3/1952 | Bellezza et al. | 174/140 |
| 2,593,955 | 4/1952 | Ackermann . | |
| 2,866,135 | 12/1958 | Cunningham . | |
| 2,947,903 | 8/1960 | Westrom | 361/126 |
| 2,997,529 | 8/1961 | Fink | 174/138 |
| 3,018,406 | 1/1962 | Innis | 361/128 |
| 3,261,910 | 7/1966 | Jacquier | 174/178 |
| 3,335,439 | 9/1968 | Yonkers . | |
| 3,412,273 | 11/1968 | Kennon et al. | 361/127 |
| 3,524,107 | 8/1970 | Reitz | 361/127 |
| 3,566,183 | 2/1971 | Olsen et al. | 315/36 |
| 3,567,541 | 3/1971 | Kaczerginski | 156/172 |
| 3,581,154 | 5/1971 | Willox . | |
| 3,586,934 | 6/1971 | Nakata | 361/329 |
| 3,631,323 | 12/1971 | Pittman . | |
| 3,706,009 | 12/1972 | Reitz | 361/127 |
| 3,725,745 | 4/1973 | Zisa | 317/104 |
| 3,735,019 | 5/1973 | Hess et al. . | |
| 3,850,722 | 11/1974 | Kreft | 156/172 |
| 3,869,650 | 4/1975 | Cunningham et al. . | |
| 3,895,762 | 7/1975 | Fletcher, Jr. et al. | 29/605 X |
| 3,898,372 | 8/1975 | Kalb . | |
| 3,973,172 | 8/1976 | Yost | 317/61 |
| 3,987,343 | 10/1976 | Cunningham et al. | 317/61.5 |
| 4,029,380 | 6/1977 | Yonkers | 339/60 R |
| 4,092,694 | 5/1978 | Stetson | 361/126 |
| 4,100,588 | 7/1978 | Kresge | 361/127 |
| 4,107,567 | 8/1978 | Cunningham et al. | 313/325 |
| 4,161,012 | 7/1979 | Cunningham | 361/128 |
| 4,218,721 | 8/1980 | Stetson | 361/117 |
| 4,298,900 | 11/1981 | Avdeenko | 361/127 |
| 4,404,614 | 9/1983 | Koch et al. | 361/126 X |
| 4,456,942 | 6/1984 | Bronikowski . | |
| 4,467,387 | 8/1984 | Bergh et al. | 361/132 |
| 4,491,687 | 1/1985 | Kaczerginski et al. | 174/178 |
| 4,656,555 | 4/1987 | Baudabaugh | 361/127 X |
| 4,812,944 | 3/1989 | Eberhard | 361/127 |

FOREIGN PATENT DOCUMENTS

| | | | |
|---|---|---|---|
| 44650 | 1/1974 | Australia . | |
| 683681 | 4/1964 | Canada . | |
| 898603 | 10/1953 | Fed. Rep. of Germany | 361/126 |
| 3001943 | 7/1981 | Fed. Rep. of Germany . | |
| 282485 | 12/1974 | U.S.S.R. . | |
| 730710 | 5/1955 | United Kingdom . | |
| 1109151 | 4/1968 | United Kingdom . | |
| 1505875 | 3/1978 | United Kingdom . | |
| 2188199 | 9/1987 | United Kingdom . | |

OTHER PUBLICATIONS

Siemens Journal of April 1963, No. 4 pp. 269–272.

*Primary Examiner*—Todd E. Deboer
*Attorney, Agent, or Firm*—Jerry M. Presson; Mark S. Bicks; Alfred N. Goodman

[57] ABSTRACT

A modular electrical assembly is enclosed in an elastomeric weathershed housing, and has a plurality of electrical components aligned in a row with terminals at the row ends. The electrical components and the terminals are in electrical connection with one another via their axially-directed ends and are axially compressed by a non-conductive filament winding. The filament winding has axial end portions wrapped about the terminals and extending axially beyond the terminals in a direction opposite to the electrical components. The winding end portions are prestressed in axial compression to increase cantilever strength and to decrease cantilever deflection.

26 Claims, 1 Drawing Sheet

BASE MOUNTED ELECTRICAL ASSEMBLY

RELATED APPLICATION

This application is a continuation of application Ser. No. 07/214,613 filed July 1, 1988 now abandoned which is a continuation-in-part of application Ser. No. 317, entitled Modular Electrical Assemblies With Pressure Relief and filed Mar. 31, 1988, the subject matter of which is hereby incorporated by references.

FIELD OF THE INVENTION

The present invention relates to polymer housed electrical assemblies formed from electrical components that are wrapped with a non-conductive filament winding and enclosed within a weathershed housing. The components can be varistors, resistors, capacitors, or any combination thereof.

BACKGROUND OF THE INVENTION

A surge protector or arrester is commonly connected across a comparatively expensive piece of electrical equipment to shunt over-current surges. Such over-current surges occur, for example, when lightning strikes. When this happens, the surge arrester shunts the surge to ground, thereby protecting the piece of electrical equipment and the circuit from damage or destruction.

Present day surge arresters commonly include an elongated, hollow cylindrical housing made of porcelain or the like, and a plurality of non-linear resistive blocks within the housing. Some of these structures also include spark gaps, the blocks and gaps being electrically interconnected to handle voltage and current surge conditions arising on a power line. The blocks commonly contain silicone carbide (SIC) or metal oxide varistors (MOV), and are usually in the shape of relatively short cylinders stacked within the arrester housing. The number of blocks employed is a function of the material (SIC or MOV) and the voltage and current ratings of the assembly.

For a surge arrester to function properly, intimate contact must be maintained between the MOV or SIC blocks. This necessitates placing an axial load on the blocks within the housing. Prior art arresters utilize bulky contact springs within the housing to provide this axial load. Typically, these springs can provide only relatively small loads, for example, about sixty pounds. As a result, prior art surge arresters experience one or more problems such as poor heat transfer between the MOV or SIC blocks and arrester terminals; non-uniform current distribution; and high contact resistances at joints. Furthermore, units having low contact force sputter and the ionized metal which is produced can cause axial flashover at high currents.

An additional problem with surge arresters of the prior art is that they, on rare occasions, fail in a dangerous fashion. When these arresters fail and experience high fault currents producing high internal gas pressures, the bursting unit may throw parts and cause property damage.

In addition, some of the prior art devices are difficult to assemble, have poor dielectric design, are susceptible to water invasion, and require totally different devices to provide varied voltage ratings.

Examples of prior art surge arresters are disclosed in the following U.S. Pat. Nos. 2,587,587 to Bellezza et al; 2,947,903 to Westrom; 2,997,529 to Fink; 3,018,406 to Innis; 3,261,910 to Jacquier; 3,412,273 to Kennon et al; 3,524,107 to Reitz; 3,566,183 to Olsen; 3,567,541 to Kaczerginski; 3,586,934 to Nakata; 3,706,009 to Reitz; 3,725,745 to Zisa; 3,850,722 to Kreft; 3,973,172 to Yost; 3,987,343 to Cunningham et al; 4,029,380 to Yonkers; 4,092,694 to Stetson; 4,100,588 to Kresge; 4,107,567 to Cunningham et al; 4,161,012 to Cunningham; 4,218,721 to Stetson; 4,404,614 to Koch et al; 4,467,387 to Bergh et al; 4,491,687 to Kaczerginski et al; and U.S. Defensive Publication No. T102,103, as well as U.K. Pat. No. 730,710; 1,109,151; and 1,505,875.

In the surge arresters of commonly assigned U.S. Pat. No. 4,656,555 to Raudabaugh, copending U.S. patent application Ser. No. 033,765 of Donald E. Raudabaugh entitled Polymer Housed Electrical Assemblies Using Modular Construction and filed Apr. 3, 1987, and copending U.S. patent application Ser. No. 176,319 entitled Modular Electrical Assemblies with Plastic Film Barriers of Donald E. Raudabaugh and filed Mar. 31, 1988, the subject matters of which are hereby incorporated by reference, epoxy soaked glass fibers surrounding and axially compressing the varistor blocks and end terminals are located in end terminal grooves closed in an axially outward direction by end terminal portions. When the epoxy cures, the wrap shrinks and does not completely fill the end terminal grooves, adversely affecting the ability to withstand cantilever loading.

SUMMARY OF THE INVENTION

Accordingly, an object of this invention is to provide electrical assemblies, particularly for surge arresters, which have a relatively high cantilever strength, are relatively simple and inexpensive to manufacture, have good dielectric design, resist water invasion, and have modular components and housings to simply vary voltage ratings.

A further object of this invention is to provide electrical assemblies, such as surge arresters, having high axial loadings, thereby resulting in uniform current distribution, low contact resistances at joints, and excellent heat transfer to the arrester terminals.

Another object of this invention is to provide an electrical assembly, such as a surge arrester, having a shatter-proof housing which has a high-impact strength and which does not fail in a dangerous fashion.

Still another object of this invention is to provide a MOV block assembly with greatly improved tensile strength.

Yet another object of this invention is to provide a surge arrester which is forgiving of dimensional variations in associated parts, thereby reducing the need for expensive close tolerances.

The foregoing objects are basically attained by providing a modular electrical assembly including a plurality of conductive electrical components aligned in a row or column and electrically connected through their axially directed ends, conductive end members located at opposite ends of the row or column and a non-conductive filament winding wrapped about the electrical components and end members. The winding applies an axially..directed compressive force on the electrical components and end members to maintain their electrical connection. Axial end portions of the winding are wrapped about the end members and extend axially beyond the end members in a direction opposite to the electrical components.

The foregoing objects are also basically attained by a method of making an electrical assembly, comprising the steps of coaxially aligning a plurality of conductive electrical components in a row or column, coaxially aligning first and second terminals with inner radial flanges at opposite axial ends of the row, releasably attaching removable caps to outer ends of the terminals defining grooves between the radial flanges and the removable caps, wrapping a resin-coated non-conductive filament winding about the electrical components and the terminals such that the winding passes over the radial flanges and winds about the terminals filling the grooves, and removing the removable caps after the resin has cured.

By forming the electrical assembly or making the electrical assembly in this manner, the winding can be axially compressed between the end member or terminal and the end plates attached to the end members. Such axial compression effectively increases the cantilever strength of the assembly, and reduces the cantilever deflection.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring to the drawings which form a part of this original disclosure.

DETAILED DESCRIPTION OF PREFERRED EMBODIMENTS

Figure 1:
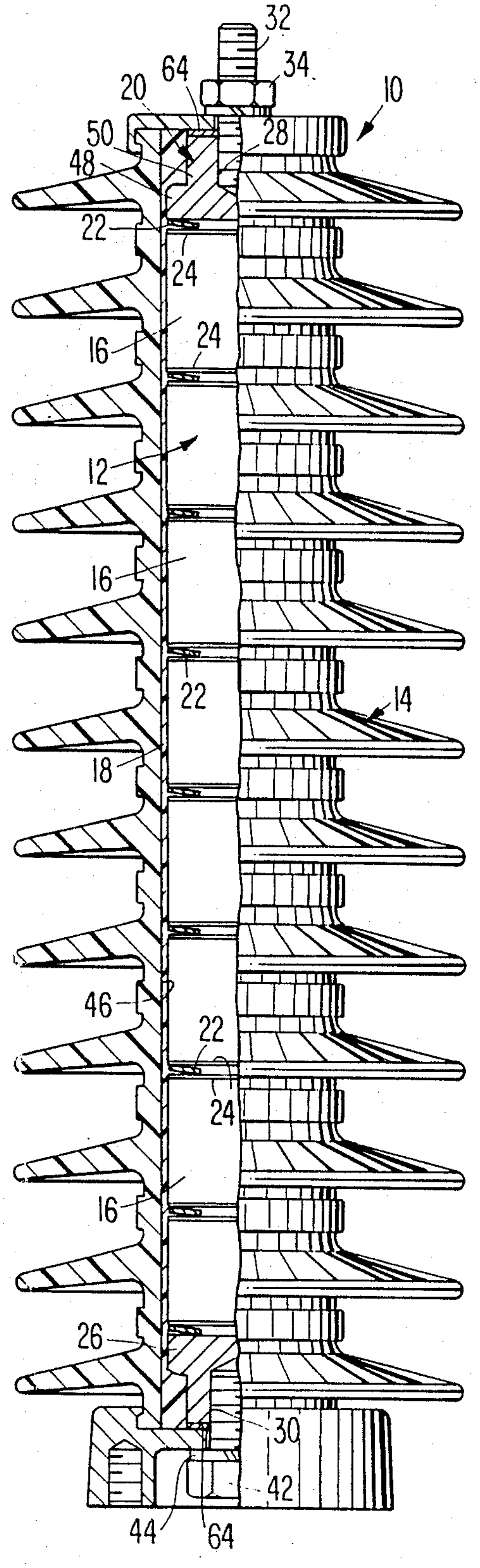
FIG. 1 is a side elevational view in partial section of a modular assembly in the form of a base mounted surge arrester, in accordance with the present invention.

Referring initially to FIG. 1, an electrical device 10, in the form of a surge arrester, according to the present invention is formed of a modular electrical assembly 12, enclosed in a polymeric, elastomeric weathershed housing 14. The illustrated electrical assembly can be advantageously substantially identical to and interchangeable with the other electrical assemblies, and is in turn formed from one or a plurality of cylindrical electrical components 16. These components are aligned in a row, and are in electrical connection with one another through their axially-directed ends and under an axially-directed compressive force developed by a non-conductive filament winding 18, as disclosed in U.S. Pat. No. 4,656,555 and Ser. No. 033,765. The electrical components can be metal oxide varistors (e.g., zinc oxide varistor blocks), resistors, capacitors, or any combination thereof.

In the case of varistors used to form a surge arrester, voltage ratings can be enlarged merely by serially and selectively coupling the plurality of modular electrical assemblies together mechanically and electrically.

The elastomeric weathershed housing 14 receives the electrical assemblies therein via a slight interference fit. This facilitates construction and allows the practice of good dielectric design by reducing radial gaps.

Electrical assembly 12 has a substantially cylindrical overall outer surface and comprises first conductive end member or terminal 20, spring washers 22, contact discs 24, electrical components 16, and second end member or terminal 26. Spring washers are employed in the electrical assembly against the contact discs at all or only some of the intermediate varistor joints, particularly for base mounted assemblies, to maintain contact pressure when the assembly bends under cantilever loading. The number of intermediate varistor joints having spring washers depends on the module length, the cantilever requirements and the position in the stack. The non-conductive filament winding 18 is coupled to end members 20 and 26, encloses the electrical components, and maintains them under an axially-directed force, which is augmented by the spring washers.

Advantageously, end members 20 and 26 are formed from aluminum. They can also be formed of any other material with suitable conductivity and mechanical strength.

End members 20 and 26 form internal terminals, have cylindrical exposed outer surfaces, and have opposite, first and second axially-directed planar ends with internally threaded sockets or bores 28 and 30 formed respectively therein. Socket 26 threadedly receives threaded end stud 32 which can be connected to an electrical power source and is in the form of a metallic, conductive bolt with an internally threaded nut 34. End plate 36 is received on end stud 32, tightly engages an end of the weathershed housing, as seen in FIG. 1, and is held in place via rigid nut 34 and a washer 38 on the stud. For base mounting, a base plate with a bolt circle can be attached. A second end plate 40 is positioned at the other end of the housing and is received on end headed stud 42 which is connected to ground and threaded in bore 30 with a washer 44 between the stud head and end plate 40. Studs 32 and 42 in essence form external terminals for the overall device 10.

Weathershed housing 14 has a through passageway in the form of a throughbore with an inwardly facing cylindrical surface 46 which tightly receives therein the outer cylindrical surface of the electrical assembly 12. The reception of the assembly in the throughbore is preferably via an interference fit with the assembly having an outer surface diameter that is about 2% to about 9% greater than the throughbore diameter and is substantially constant along its length. This reduces radial gaps and thus provides advantageous dielectric design.

Figure 2:
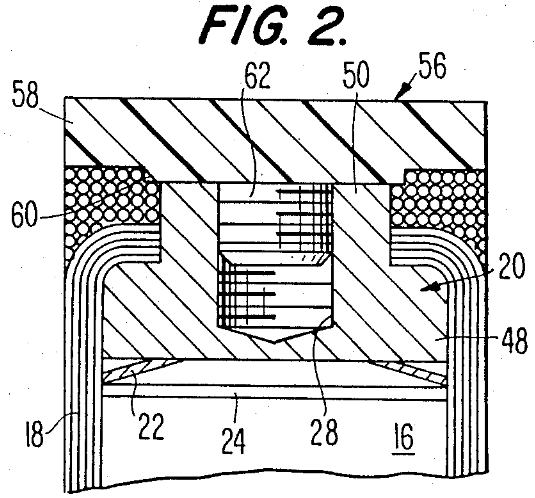
FIG. 2 is an enlarged, partial side elevational view in longitudinal section of the assembly illustrated in FIG. 1 in the process of being made.
Figure 3:
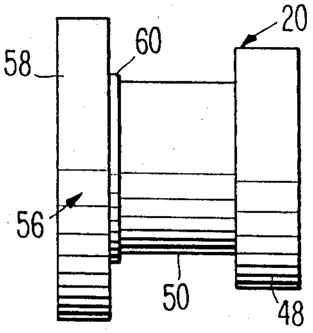
FIG. 3 is elevational view of an end terminal and removable, according to one embodiment of the present invention.

Since end members 20 and 26 are identical, only end member 20 is described in detail. Referring initially to FIGS. 1–3, end member 20 comprises an inner section 48 and an outer section 50. Inner section 48 is oriented adjacent the electrical components 16 and has a cylindrical lateral surface with a transverse diameter substantially equal to the electrical components. Outer section 50 also has a cylindrical lateral surface, but has a transverse diameter substantially less than inner section 48 such that the inner section forms a radially outwardly extending flange on the outer section.

Figure 4:
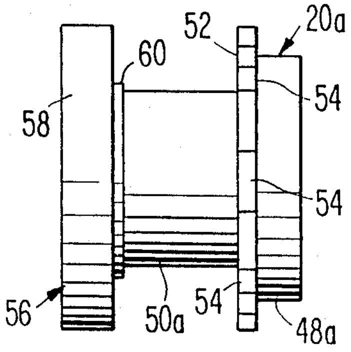
FIG. 4 is elevational view of an end terminal and removable cap according to another embodiment of the present invention.
Figure 5:
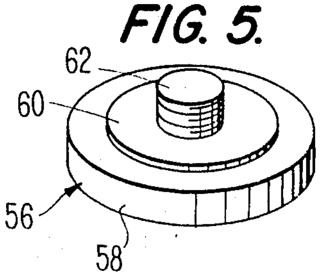
FIG. 5 is a perspective view the removable cap of FIGS. 2, 3 and 4.

FIG. 4 illustrates an alternative end member or terminal 20*a* of the type disclosed in U.S. Patent Application Ser. No. 176,317. End member 20*a* comprises an inner section 48*a* and an outer section 50*a* separated by a radially extending flange 52. Inner section 48*a* is oriented adjacent the electrical components 16 and has a cylindrical lateral surface with a transverse diameter substantially equal to the electrical components. Outer section **50*a* also has a cylindrical lateral surface, but has a transverse diameter substantially less than inner section 48*a***.

Flange 52 is generally circular in plan view and extends radially outwardly from the interface between sections **48*a* and 50*a*. Radially inwardly extending and radially outwardly opening notches 54 are formed in the flange. Eight uniformly dimensioned notches are evenly and circumferentially spaced about flange 52** in the illustrated embodiment. The number of notches will vary depending upon the component diameter. More notches will be used with larger component diameters, and less notches will be used with smaller component diameters.

End member **20*a*** facilitates wrapping a non-conductive filament, e.g., glass in a pattern with diamond shaped lateral openings. The openings are filled with a fracturable insulating material having suitable insulating and mechanical characteristics, for example epoxy. Other suitable insulating materials include polyester, foam, rubber, silicone grease or gas, such as air. If the housing is molded about the electrical assembly wrap, the molded housing material can fill the openings.

With either end member form, 20 or **20*a*, a removable cap 56 is attached prior to wrapping of the filament winding. The removable cap comprises a circular disc-shaped base 58, a central cylindrical boss 60 extending coaxially relative to base 58, and an externally threaded member 62 extending coaxially from the boss. The boss has a transverse diameter greater than that of outer section 50, but less than that of inner section 48. Base 58 has a transverse diameter greater than that of inner section 48, and substantially equal to that of flange 52 of end member 20*a* and to the outer surface of winding 18**. The cap base and boss are preferably formed of plastic such as Teflon to facilitate removal. Nonplastic material with good release characteristics can also be used for the cap base and boss, including metals if coated with release agents.

A releasable cap 56 is attached to each end member 20 or 26 by threading member 62 into bore 28 or 30. As illustrated in FIGS. 2–4, inner section 48 or **48*a* and cap 56 define a groove for receiving the filament winding. Boss 60** causes the winding to extend axially beyond the end member outer end surface when the filament completely fills the groove.

The filament is initially wound in a desired pattern, e.g., one of the patterns disclosed in the above cited, commonly owned patent and patent applications, until the filament develops a predetermined thickness. Additional fiber filament is wound about the outer sections 50 or **50*a*** until the filament surrounding such sections has an outer peripheral surface at least equal to the winding outer surface between the terminals and fills the terminal grooves. After the epoxy resin on the filament cures, the caps are removed. The outer surface of the assembly is then abraded to the extent necessary to provide a uniform cylindrical surface along its entire length.

Upon removal of the removable caps, the winding is formed with axial end portions which extend axially beyond the end members or terminals in a direction opposite to the electrical components. These axial end portions can be prestressed in axial compression between the end members and the end plates attached to the end members as illustrated in FIG. 1. Since the glass filament is circumferentially wrapped in the axial end portions thereof, the compression strength is greater than the tensile strength.

When device 10 is loaded in a cantilever manner, one side of the device is subjected to tension, while the other side is subjected to compression. The axially compressive prestressing of the winding end portions prevents the tensile side from being placed in tension until at least the compressive prestressing is relieved. This increases the cantilever strength, which is required for base mounted devices, particularly base moved surge arresters. Additionally, the axially compressive prestressing decreases the cantilever deflection since the initially straight joints are not loose.

To provide sealing against water invasion, preferably a gasket 64 is interposed between each end member and the adjacent end plate, and silicone grease is interposed between each adjacent end plate and end member, between adjacent end members, and between the outer surfaces of the electrical assemblies and the inwardly facing surfaces of the throughbore in each weathershed housing section. Use of grease between the weathershed housing section and the electrical assembly aids in construction and assembly by reducing friction and also reduces any radial gaps therebetween.

Advantageously, the longitudinal axes of the studs, the electrical components in each assembly, and the weathershed housing are coaxially aligned. Preferably, the planar ends of the end members are perpendicular to these aligned longitudinal axes.

Preferably, with regard to the electrical device 10, the axial load on the electrical components before winding is about 750 pounds per square inch, and the filament or stranded element of fibers is wet, epoxy coated fiberglass which is wound through about 100 turns and is cured for about two hours at 150° C.

While particular embodiments have been chosen to illustrate the invention, it will be understood by those skilled in the art that various changes and modifications can be made therein without departing from the scope of the invention as defined in the appended claims.

What is claimed is:

1. A modular electrical assembly, comprising:

a plurality of electrical components having nonlinear voltage-current characteristics aligned in a row along an axis and having axially directed ends, said electrical components being electrically connected at said axially directed ends;

first and second conductive end members having a shoulder surfaces nonparallel to said axis and substantially coaxial with said components and located at opposite ends of said row; and a non-conductive filament winding wrapped about said electrical components and said end members and surrounding said shoulder surfaces to apply an axially directed compressive force on said electrical components and end members through said shoulder surfaces to maintain electrical connection therebetween, said winding having axial end portions wrapped about said end members and extending axially beyond said end members in a direction opposite to said electrical components.

2. A modular electrical assembly according to claim. 1 wherein said axial end portions are prestressed in axial compression between said end members and end plates attached to said end members.

3. A modular electrical assembly according to claim 2 wherein said end members and said end plates are attached by threaded fasteners threadedly received in internally threaded bores in said end members.

4. A modular electrical assembly according to claim 1 wherein an elastomeric housing coaxially surrounds and frictionally engages said filament winding.

5. A modular electrical assembly according to claim 4 wherein said housing has an internal throughbore forming an interference fit with said filament winding.

6. A modular electrical assembly according to claim 4 wherein said housing is a weathershed housing.

7. A modular electrical assembly according to claim 1 wherein said electrical components are varistors.

8. A modular electrical assembly according to claim 7 wherein said varistors are generally cylindrical metal oxide varistors.

9. A modular electrical assembly according to claim 1 wherein said first and second conductive end members comprise inner sections adjacent said electrical components and outer sections remote from said electrical components, said inner sections having transverse dimensions greater than corresponding transverse dimensions of said outer sections to define open grooves substantially normal to said axis for said winding which are axially open in outer directions.

10. A modular electrical assembly according to claim 9 wherein said electrical components are generally cylindrical varistor blocks; and said inner sections of said end members have substantially equal transverse diameters with said varistor blocks.

11. A modular electrical assembly according to claim 9 wherein said inner and outer sections are generally cylindrical and substantially coaxial.

12. A modular electrical assembly according to claim 1 wherein said axial end portions of said winding comprise circumferential wrappings of filament.

13. A surge arrestor, comprising:

a plurality of generally cylindrical, metal oxide varistor blocks aligned in a row along an axis and having axially directed ends, said varistor blocks being in electrical connection with one another through said axially directed ends;

first and second generally cylindrical, conductive terminals at opposite ends of each said row, each said terminal having a first axial end in contact with one of said varistor blocks, and an opposite second axial end with an internally threaded socket, said terminals having inner sections adjacent said first axial ends and outer sections adjacent said second axial ends, said inner sections being wider than said outer sections to define open grooves which are axially open at said second axial ends and substantially normal to said axis, said varistor blocks and said inner sections of said terminals having substantially equal transverse diameters;

a non-conductive filament winding wrapped around said varistor blocks and said terminals and applying an axially-directed compressive force on said varistor blocks and said terminals to maintain electrical connection thereof, said winding filling said grooves and extending axially outwardly beyond said second axial ends of said terminals; and elastomeric weathershed means, resiliently enclosing said varistor blocks, for protecting said varistor blocks, said weathershed means having a substantially cylindrical throughbore with a diameter substantially equal to transverse diameters of said filament winding.

14. A surge arrester according to claim 13 wherein spring washers couple adjacent varistor blocks.

15. A surge arrester according to claim 13 wherein said winding in said grooves are prestressed in axial compression.

16. A surge arrester according to claim 13 wherein end plates, attached to said terminals by threaded fasteners, axially compress said winding in said grooves.

17. A method of making an electrical assembly, comprising the steps of:

coaxially aligning a plurality of electrical components having nonlinear voltage-current characteristics in a row along an axis;

coaxially aligning first and second conductive terminals with each terminal having a shoulder surface nonparallel to said axis and substantially coaxial with said components and having inner a radial flange at opposite axial ends of the row;

releasably attaching removable caps to outer ends of the terminals defining grooves between the radial flanges and the removable caps with portions of the grooves extending axially beyond the terminals;

wrapping a resin-coated non-conductive filament winding about the electrical components and the terminals such that the winding passes over the radial flanges and winds about the terminals filling the grooves; and removing the removable caps after the resin has cured.

18. A method according to claim 17 wherein the removable caps have central, axially extending bosses directly contacting outer axial ends of the terminals such that the winding extends axially beyond the outer ends of the terminals after removal of the removable caps.

19. A method according to claim 18 wherein said winding is axially compressed at exposed axial ends thereof.

20. A modular electrical assembly, comprising;

a plurality of electrical components aligned in a column along an axis and having axially directed ends, said electrical components being electrically connected at said axially directed ends;

first and second conductive end members located at opposite ends of said column, said end numbers having shoulders extending radically relative to said axis; and a non-conductive filament winding wrapped about said electrical components and said end members, engaging said shoulders, and applying an axially directed compressive force through said shoulders on said electrical components and end members to maintain electrical connection therebetween, said winding having axial end portions wrapped about said end members and extending axially beyond said end members in a direction opposite to said electrical components.

21. A modular electrical assembly according to claim 20 wherein said axial end portions are prestressed in axial compression between said end members and end plates attached to said end members.

22. A modular electrical assembly according to claim 20 wherein said electrical components are varistors.

23. A modular electrical assembly according to claim 22 wherein said varistors are generally cylindrical metal oxide varistors.

24. A modular electrical assembly according to claim 20 herein said first and second conductive end members comprise inner sections adjacent said electrical components and outer sections remote from said electrical components, said inner sections having transverse dimensions greater than corresponding transverse dimensions of said outer sections to provide said shoulders and to define grooves opening radially outwardly relative to said axis and opening axially in outer directions relative to said column.

25. A modular electrical assembly according to claim 24 where in said electrical components are generally cylindrical varistor blocks; and said inner sections of said end members have substantially equal transverse diameters with said varistor blocks.

26. A modular electrical assembly according to claim 20 wherein said axial end portions of said winding comprise circumferential wrappings of filament.

* * * * *